United States Patent [19]

Robinson

[11] Patent Number: 5,024,635
[45] Date of Patent: Jun. 18, 1991

[54] RELATING TO RAM UNITS IN TRANSMISSIONS OF THE TOROIDAL RACE, ROLLING TRACTION TYPE

[76] Inventor: Leslie K. Robinson, 16 Cedarwood Drive, Leyland Preston, Lancashire PR5 1HN, England

[21] Appl. No.: 389,485

[22] Filed: Aug. 4, 1989

[30] Foreign Application Priority Data

Aug. 4, 1988 [GB] United Kingdom ............... 8818518

[51] Int. Cl.$^5$ ................. F16H 15/36; F15B 15/22
[52] U.S. Cl. ............................ 475/115; 91/405; 91/409; 74/200
[58] Field of Search ................. 475/114, 115; 137/625.09; 91/405, 409; 74/200

[56] References Cited

U.S. PATENT DOCUMENTS

| | | | |
|---|---|---|---|
| 3,034,482 | 5/1962 | Rader | 91/405 |
| 3,093,118 | 6/1963 | Brown | 91/405 |
| 3,322,039 | 5/1967 | Madland | 91/405 |
| 3,442,178 | 5/1961 | Daniels | 91/405 |
| 3,695,378 | 10/1972 | Garrison et al. | 91/405 X |
| 3,802,319 | 4/1974 | Bridwell et al. | 91/405 |
| 3,898,915 | 8/1975 | Neuman | 91/409 X |
| 4,297,918 | 11/1981 | Perry | 74/690 |
| 4,662,248 | 5/1987 | Greenwood | 74/867 |
| 4,700,611 | 10/1987 | Kaneko | 91/405 |

FOREIGN PATENT DOCUMENTS

| | | | |
|---|---|---|---|
| 2206410 | 8/1973 | Fed. Rep. of Germany | 92/405 |
| 2023753 | 1/1980 | United Kingdom | 475/192 |
| 2054068 | 7/1980 | United Kingdom . | |

Primary Examiner—Allan D. Herrmann
Assistant Examiner—Khoi Q. Ta
Attorney, Agent, or Firm—Davis, Bujold & Streck

[57] ABSTRACT

A hydraulic ram unit for a transmission of the toroidal-race, rolling-traction type. The ram is connected to the rollers of the transmission so that the position of the ram within its stroke is related to the angular setting of the rollers and so to the transmitted ratio. The ram pistons move within cylinders the inlet and outlet ports of which are located in the cylinder end walls, with the outlet ports axially protruding of the inlet ports. If a piston overshoots its normal stroke it tends first to restrict flow through the outlet port and then to contact and obstruct it, so creating firstly hydraulic and then contact forces to resist further overshoot, without substantially restricting the inlet port. Novel construction for the ram itself, and for the ram cylinders and casing are also described.

14 Claims, 2 Drawing Sheets

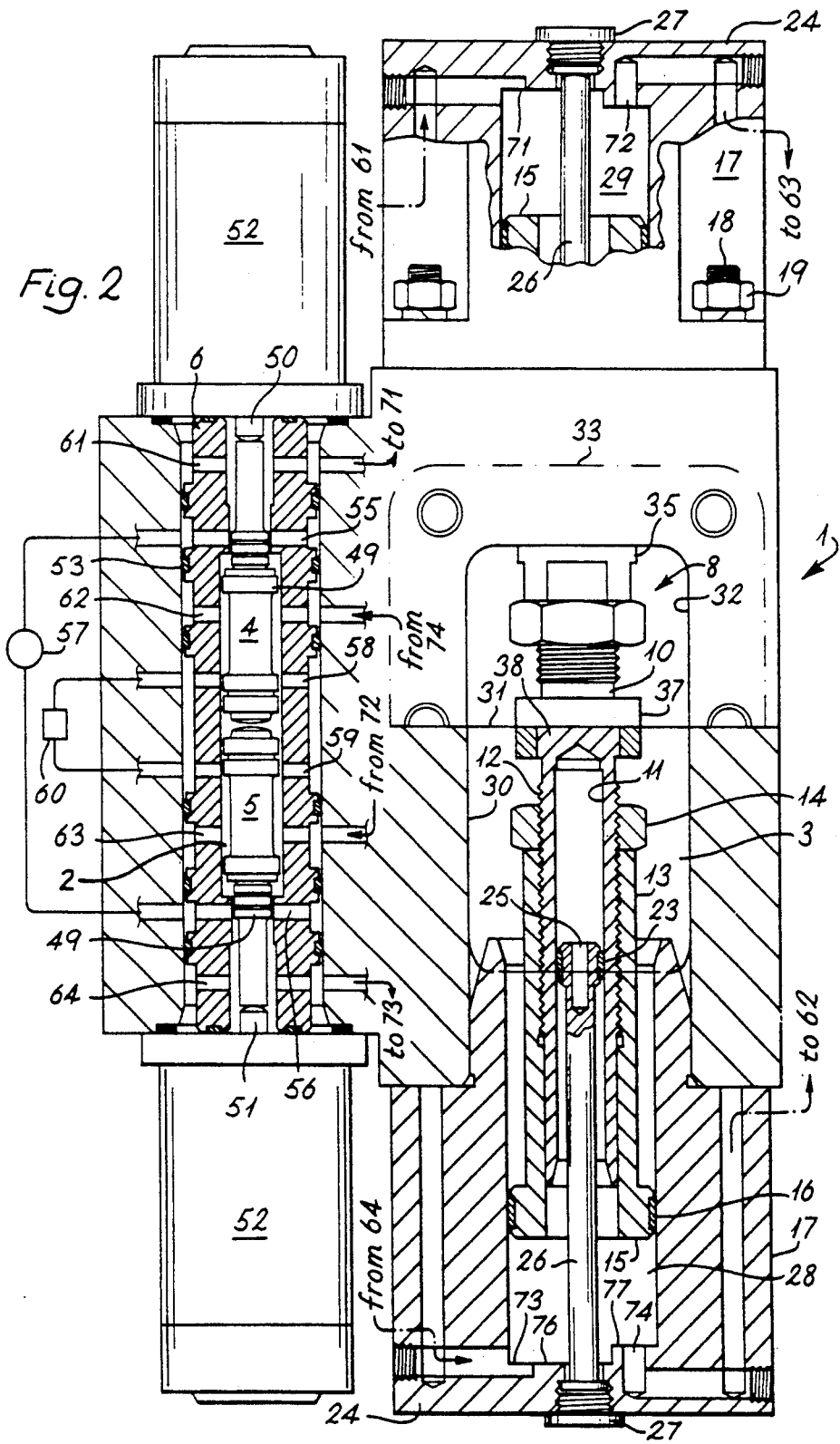

RELATING TO RAM UNITS IN TRANSMISSIONS OF THE TOROIDAL RACE, ROLLING TRACTION TYPE

This invention relates to ram units for use in transmissions of the toroidal-race, rolling-traction type. It relates particularly but not exclusively to hydraulic ram units of a known general kind which are mechanically connected to the carriages that support the rollers by which traction is transmitted between the input and output toroidal discs; movement of the ram results in a change in the attitude of the roller, and thus a change in the transmitted ratio also. Such a mechanism is generally well known in the art, and examples of it are described in detail in many published patent specifications, for instance GB-C-2023753 and EP-A-0133330.

It has been customary for such ram units to comprise an integral, double-ended piston moveable within a one-piece cylinder liner mounted in a cylinder housing, and for the piston and liner to be manufactured to a high degree of finish and fit by precision methods. Such methods are expensive, especially where the precision-fit piston is made so that its length can be adjusted.

In both of the patent specifications just recited, means are also provided to set up a "hydraulic end stop", effect, to resist and arrest further movement of the ram piston, should the transmission encounter a driving condition in which the rollers tend to overshoot their normal range of attitudes and so be in danger of running off the edges of the toroidal discs. In such conditions, by resisting and arresting the movement of the piston, the corresponding movement of the connected rollers is resisted and arrested also. In GB-C-2023753 the end stop effect is created by a sleeve which fits over the shaft of the ram piston. If the piston overshoots its normal range of movement, the sleeve is mechanically moved so as to alter the normal flow of the operating fluid and trap a volume of fluid which opposes further piston overshoot. In EP-A-0133330, as in GB-C-2023753, the ram cylinder cavity is in normal use connected both to a pressurized source of hydraulic fluid and to exhaust. In EP-A-0133330, however, the outlet ports are formed in the cylindrical side wall of the ram cavity, and as the piston head overshoots its normal range of movement it itself covers the outlet port, so automatically raising the pressure of the volume of fluid now trapped in the cavity end.

Aims of the present invention include simplifying the ram, facilitating both the adjustment of the piston and the means of connecting it to the rollers, and providing an improved end-stop mechanism. The invention is defined by the claims, the disclosure of which is to be considered as included within the contents of this specification, and the invention will now be described by way of example with reference to the accompanying drawing in which:

FIG. 2 is partly in plan, and partly a section on the line II—II in FIG. 1, with certain parts removed.

Figure 1:
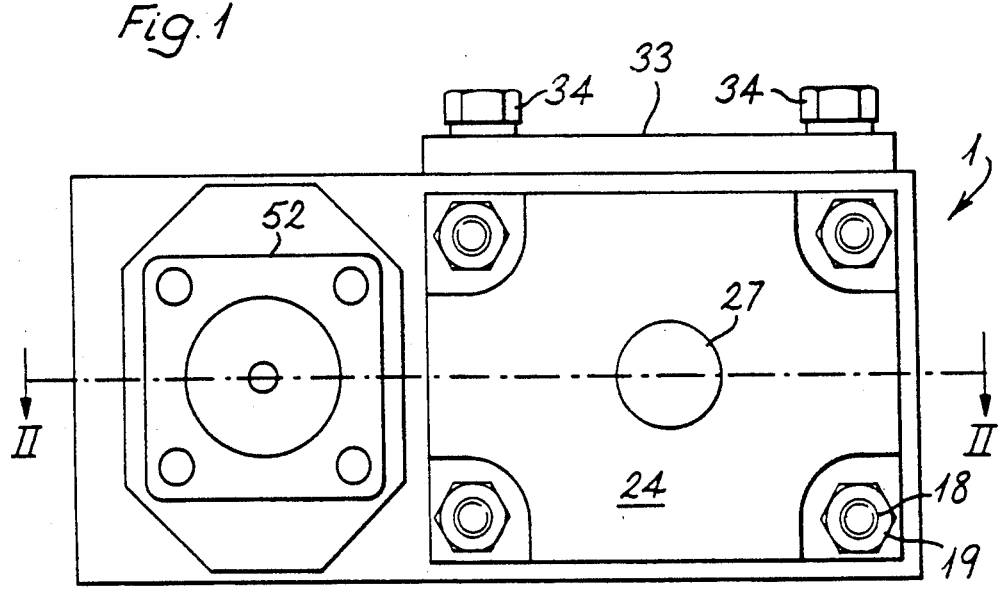
FIG. 1 is an end elevation of a ram and associated control valve.

A block 1 is formed with cavities 2 and 3. Cavity 3 houses a ram 8 of which only part is visible in FIG. 2. The ram comprises a central shank 10 into which bores 11 have been drilled from opposite ends. Shank 10 is externally threaded at 12 to receive two oppositely-facing internally-threaded piston head units 13 held in location by locknuts 14. The end 15 of the units 13 constitute the ram pistons and are formed with grooves to receive PTFE rings 16. Cylinder units 17 are secured to block 1 by studs 18 and nuts 19, and while there is clearance between the cylinders 17 and the pistons 15, the rings 16 establish the necessary sliding and sealing contact of the pistons within the cylinders. Damping of the motion of the hydraulic ram is effected by plungers 25 which slide within bores 11 and are carried on rods 26 flexibly supported by caps 27 in the end walls 24 of units 17. Pistons 15 and cylinders 17 define between them working spaces 29 and 28 at the top and bottom of FIG. 2 respectively.

Cavity 2 houses a control valve for the ram unit, the valve being essentially of the kind shown in patent specification U.S. Pat. No. 4,662,248, already referred to. The control valve comprises two similar spools 4, 5 formed with lands 49 and movable within a stepped bore defined by a liner 6. The spools move under the influence of plungers 50, 51 driven by the controlled operation of opposed solenoids which are not shown but are housed within caps 52. Liner 6 fits within cavity 2 and is separated from it by ring seals 53 which divide the annular clearance between liner 6 and block 1 into a number of separated compartments. The stepped bore of liner 6 is formed with a number of ports each communicating, by way of a separate comparment within the annular clearance, with a separate passage formed within block 1. Ports 55, 56 communicate by way of their associated passages with a pressurized source 57 of hydraulic fluid, and ports 58, 59 communicate similarly with a drain 60. Port 61 communicates with an inlet port 71 to space 29, port 63 with an outlet port 72 from space 29, port 64 with an inlet port 73 to space 28 and port 62 with the outlet port 74 from space 28.

In normal operation of the transmission, spools 4, 5 are subjected to opposed and variable control forces by the plungers 50, 51. If the force of plunger 50 exceeds that of 51, spools 4, 5 will move downwards as seen in FIG. 2. The lands 49 on the two spools will therefore tend to cover ports 56, 59 and to uncover ports 55, 58. Pressure will therefore tend to rise in working space 29 and fall in 28, so that the forces exerted upon the ram 8 by the fluid in the two working spaces tend to move it downwards also. Conversely if the force of plunger 51 exceeds that of 50, the spools 4, 5 will move upwards so as to cover ports 55, 58 but uncover 56, 59, so tending to raise pressure in space 28 but lower it in space 29, so that the ram 8 is urged to move upwards.

According to the invention, inlet and outlet ports 71–74 are formed on the end walls 24 of their respective working spaces 29, 28 and while the inlet ports 71–73 open into the base surfaces 76 of those walls, the outlet ports 72, 74 open into steps 77. Each outlet port therefore lies axially protruding of its respective inlet port. Therefore if the ram 8 exceeds its normal stroke so that one of the pistons 15 approaches its end wall 24, the piston will first restrict the outlet port and then—if the approach continues—actually contact the step 77 and block the outlet, without obstructing the inlet port in the same way. When the approaching piston restricts the outlet port (72 or 74), as just described, it increases the flow resistance of the port. The pressure in the working space therefore rises, so opposing further overshoot of the ram and thus exerting a "hydraulic end stop" effect. Should the overshoot nevertheless continue, it will of course cease when the forward face of the piston actually contacts step 77. The outlet port will then be completely blocked, and the same region of the end wall 24 which provided the hydraulic end stop effect will supplement it with a physical stop effect also.

A rectangular aperture 30, located symmetrically to either side of the transverse centre line 31 of block 1, is formed in the lower wall of that block beneath cavity 3, and a similar but slightly smaller rectangular aperture 32 is formed in the top wall and is normally covered by a plate 33 (FIG. 1) held in place by bolts 34. Plate 33 can be removed to allow access for a spanner to flats 35 on units 13, whereby to adjust their positions on shank 10 and so vary the length of the piston assembly.

Figure 3:
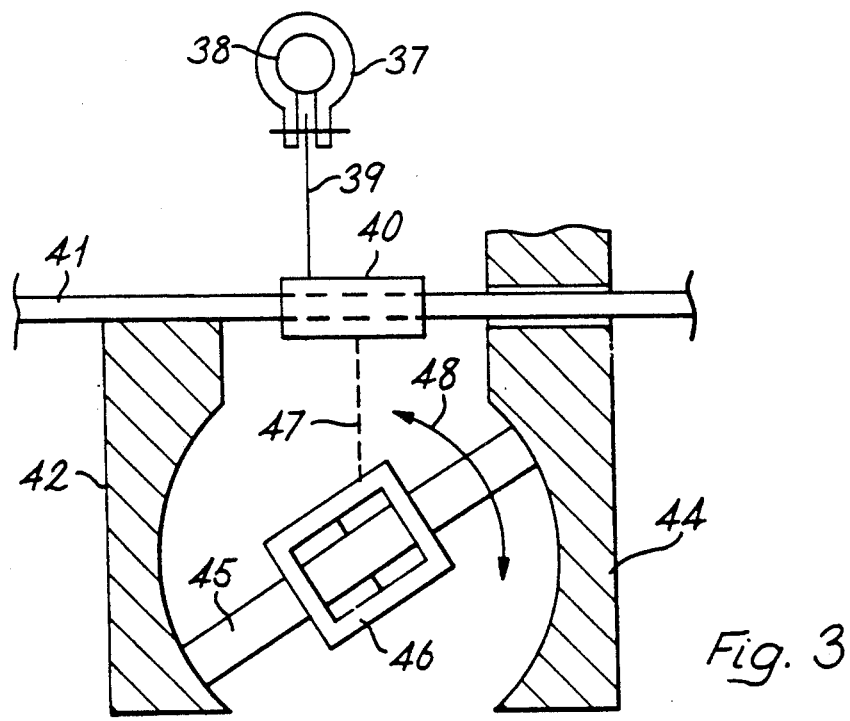
FIG. 3 is a schematic view indicating the interconnection between the ram and the rollers of the transmission.

FIGS. 2 and 3 show means to connect piston 15 with at least one roller 45 of the transmission, whereby the angular orientation of the roller 45 is related to the axial position of the piston 15 within the cylinder. As FIGS. 2 and 3 show best, aperture 30 accommodates the mechanism by which the piston assembly is connected to the rollers of the transmission, and the movement of that mechanism. A grip 37, clamped to a central boss 38 on shank 10, supports a pivot point for one end of a lever 39. This lever corresponds to item 51 in FIG. 1 of specification GB-C-2023753, already referred to, and the other end of it is fast with a sleeve 40 which is rotatable about the input shaft 41 of a continuously-variable-ratio transmission of the toroidal-race, rolling traction type. The transmission comprises at least one input disc 42, secured to shaft 41 in a manner preventing relative rotation of shaft and discs, and an output disc 44. Rollers 45, mounted in carriages 46, transmit drive from discs 42 to disc 44. By means which are well known in the art, but which are not part of the present invention and are therefore shown only schematically at 47 in FIG. 3, sleeve 40 is connected to carriage 46 so that rotation of sleeve 40 by lever 39 causes the orientation of rollers 45 to swing in the sense indicated by arrows 48, so varying the transmitted ratio.

The annular clearance between piston ends 15 and the inner walls of cylinder unit 17 allows both these parts to be formed by casting or general machining, without the need for expensive finishing, and the PTFE rings, 16, like the similar rings 23 on plungers 25, provide both adequate sealing and adequate freedom of axial movement for a reasonable lifetime, after which they can easily be replaced.

I claim:
1. In or for a transmission of the toroidal-race, rolling-traction type:
    A hydraulic ram comprising a cylinder, and a piston movable within that cylinder so that the piston and cylinder define between them a working space of variable volume, the space being bounded at one axial end by the piston and at the other by an axial end wall of the cylinder;
    means to connect the piston to at least one roller of the transmission, whereby the angular orientation of the roller is related to the axial position of the piston within the cylinder;
    inlet and outlet ports to the working space, the inlet port being connectable in use to a source of hydraulic fluid under pressure and the outlet port to exhaust; in which the inlet and outlet ports are both formed in the axial end wall of the cylinder, and in which:
    the axial end wall of the cylinder provides a stepped boundary for the working space;
    the outlet port is located on the step but the inlet port is located below it, and the outlet port lies axially protruding of the inlet port, whereby as the piston approaches the end wall it tends firstly to increase the flow resistance of the outlet port and secondly to contact it and so be prevented from further axial movement, without substantially obstructing the inlet port.

2. In or for a transmission of the toroidal race, rolling-traction type, a double-acting hydraulic ram comprising two rams according to claim 1 in which the two ram pistons are formed at opposite ends of a common shank which is connectable in use to the rollers of the transmission.

3. In or for a transmission of the toroidal-race, rolling-traction type, a double acting hydraulic ram according to claim 2, in which an axial bore is formed in at least one of the ends of the shank, and receives a damping plunger fixed to the corresponding cylinder.

4. In or for a transmission of the toroidal-race, rolling-traction type, a double acting hydraulic ram according to claim 2, in which the piston heads make screw-threaded engagement with the shank.

5. In or for a transmission of the toroidal-race, rolling-traction type, a double acting hydraulic ram according to claim 2 in which the cylinders are mounted at opposite axial ends of a ram casing formed with a first aperture mid-way along its axial length, the aperture providing access for an operating linkage to connect the shank to at least one of the rollers of the transmission.

6. In or for a transmission of the toroidal-race, rolling-traction type, a double acting ram according to claim 5 in which the ram casing is formed with a second aperture located substantially diametrically opposite to the first aperture and providing access whereby the axial positions of the piston heads on the central shank may be adjusted.

7. In or for a transmission of the toroidal-race, rolling-traction type:
    a hydraulic ram comprising a cylinder, and a piston movable within that cylinder so that the piston and cylinder define between them a working space of variable volume, the space being bounded at one axial end by the piston and at the other by an axial end wall of the cylinder;
    means to connect the piston to at least one roller of the transmission, whereby the angular orientation of the roller is related to the axial position of the piston within the cylinder;
    inlet and outlet ports to the working space, the inlet port being connectable in use to a source of hydraulic fluid under pressure and the outlet port to exhaust;
    in which the inlet and outlet parts are both formed in the axial end wall of the cylinder, and in which the outlet port lies axially protruding of the inlet port, whereby as the piston approaches, the end wall it tends progressively to increase the flow resistance of the outlet port until it blocks the port by making contact with that end wall, in which said contact imposes a physical restrain which prevents further axial movement of the piston, and in which said approach and contact of said end wall by the piston avoids substantially obstructing the inlet port.

8. In or for a transmission of the toroidal race, rolling-traction type, a hydraulic ram according to claim 7 in which the axial end wall of the cylinder provides a stepped boundary for the working space, in which the outlet port is located on the step but the inlet port is located below it.

9. In or for a transmission of the toroidal race, rolling-traction type, a double-acting hydraulic ram comprising two rams according to claim 8 in which the two ram pistons are formed at opposite ends of a common shank which is connectable in use to the rollers of the transmission.

10. In or for a transmission of the toroidal-race, rolling-traction type, a double acting hydraulic ram according to claim 9 in which an axial bore is formed in at least one of the ends of the shank, and receives a damping plunger fixed to the corresponding cylinder.

11. In or for a transmission of the toroidal-race, rolling-traction type, a double acting hydraulic ram according to claim 9, in which the piston heads make screw-threaded engagement with the shank.

12. In or for a transmission of the toroidal-race, rolling-traction type, a double acting hydraulic ram according to claim 9 in which the cylinders are mounted at opposite axial ends of a ram casing formed with a first aperture mid-way along its axial length, the aperture providing access for an operating linkage to connect the shank to at least one of the rollers of the transmission.

13. In or for a transmission of the toroidal-race, rolling-traction type, a double acting ram according to claim 12 in which the ram casing is formed with a second aperture located substantially diametrically opposite to the first aperture and providing access whereby the axial positions of the piston heads on the central shank may be adjusted.

14. A toroidal-race, rolling-traction transmission comprising:

a hydraulic ram comprising a cylinder, and a piston movable within that cylinder so that the piston and cylinder define between them a working space of variable volume, the space being bounded at one axial end by the piston and at the other by an axial end wall of the cylinder;

means to connect the piston to at least one roller of the transmission, whereby the angular orientation of the roller is related to the axial position of the piston within the cylinder;

inlet and outlet ports to the working space, the inlet port being connectable in use to a source of hydraulic fluid under pressure and the outlet port to exhaust; in which the inlet and outlet ports are both formed in the axial end wall of the cylinder, and in which the outlet port lies axially protruding of the inlet port, whereby as the piston approaches the end wall it tends firstly to increase the flow resistance of the outlet port and secondly to contact it and so be prevented from further axial movement, without substantially obstructing the inlet port.

* * * * *

UNITED STATES PATENT AND TRADEMARK OFFICE
CERTIFICATE OF CORRECTION

PATENT NO. : 5,024,635

DATED : June 18, 1991

INVENTOR(S) : Leslie Kendrick ROBINSON

It is certified that error appears in the above-identified patent and that said Letters Patent is hereby corrected as shown below:

Column 4, line 54 replace "parts" with --ports--.

Signed and Sealed this

Third Day of November, 1992

Attest:

DOUGLAS B. COMER

Attesting Officer

Acting Commissioner of Patents and Trademarks